Jan. 25, 1966  J. BATIGNE ET AL  3,230,596
EQUIPMENT FOR BURNING REFRACTORY PRODUCTS
Filed March 26, 1962
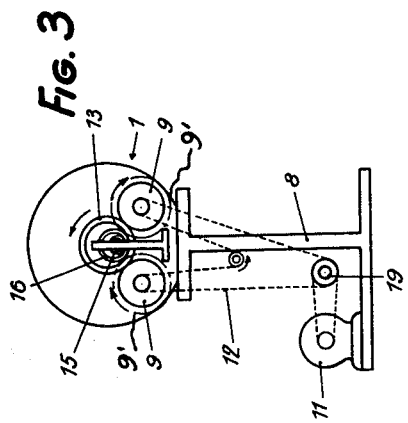
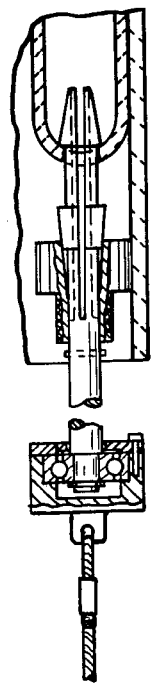
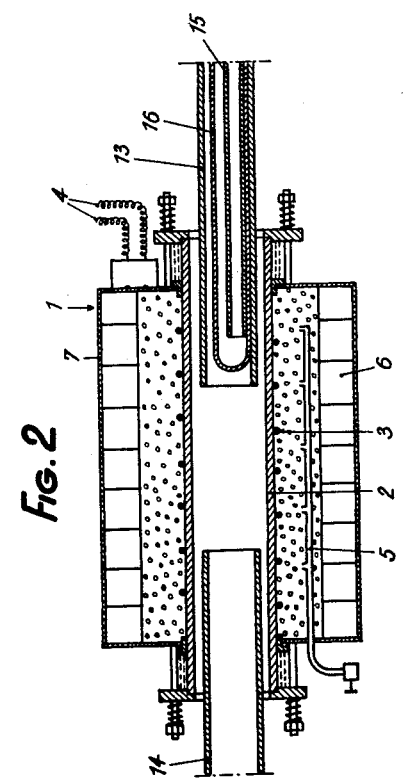
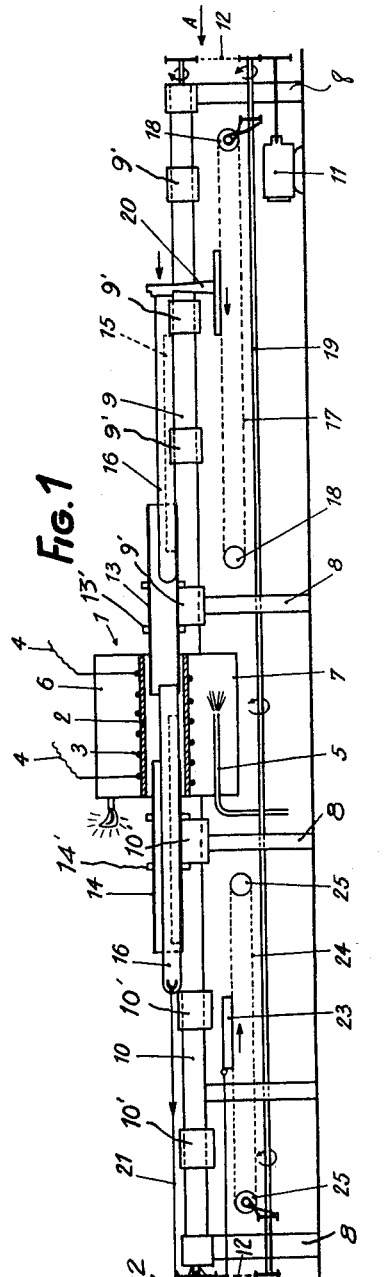
INVENTORS
JEAN BATIGNE
RENE DIDIER
BY
Allan R. Redraw

United States Patent Office 3,230,596
Patented Jan. 25, 1966

3,230,596
EQUIPMENT FOR BURNING REFRACTORY PRODUCTS
Jean Batigne, Enghien-les-Bains, and René Didier, Paris, France, assignors to Norton Company, Worcester, Mass., a corporation of Massachusetts
Filed Mar. 26, 1962, Ser. No. 182,364
3 Claims. (Cl. 25—132)

This invention relates generally to a kiln for firing ceramic products and is concerned particularly with a construction for uniformly firing a product of relatively great length and of weak cross section such as tubes, bars, and the like.

In the prior art kilns have been provided for uniformly firing ceramic products wherein the dimensions of the kiln are adapted to the product to be fired. It is difficult in kilns of large size to position elongated products therein, in a manner to heat such products uniformly when they are situated in the kiln. This causes difficulties in firing, due to uneven heating within the kiln which produces shrinkage stresses that warp the product and may result in rejections due to the deformations produced. This is especially a problem when firing tubular products which must be held to relatively close tolerances with respect to straightness and circularity in cross section.

It is the purpose of this invention to provide a kiln structure which permits uniform firing and continuous production of ceramic products without deformation during firing even though the product be relatively long as compared with its cross sectional dimensions. It is another object of this invention to provide a kiln structure in which ceramic products of relatively great length may be fired while retaining straightness together with a more perfect circular cross sectional shape without requiring the usual additional operation to remove distortions produced during firing by means such as grinding.

The purposes of this invention are accomplished by delivering a ceramic product of great length through the firing zone of a kiln with a uniform forward feeding movement. The hot zone of the kiln may have a relatively small dimension somewhat shorter than the length of the product to be fired and the speed of movement of the product through the zone is controlled to accomplish the necessary firing as the product progresses through the hot zone. Simultaneously with movement of the product through the firing zone, the products are rotated about their longitudinal axes while completing the firing cycle. In following this invention progressive firing of the product is provided wherein the optimum firing temperature can be maintained easily within a relatively small closely confined zone in the kiln while progressively subjecting the product to a uniform firing temperature at all its points.

The rotation of the product as it progressively passes through the heating zone of the kiln further serves to insure uniform heating of the product and effects even distribution of the firing strains to eliminate stresses which might otherwise deform the product.

In following this invention a relatively short firing zone of high temperature is provided in the kiln for receiving products delivered longitudinally therethrough. The kiln may be provided with open ends to receive the product to be fired which is preferably fed continuously therethrough while being rotated. Suitable means are provided for accomplishing the feed of the product through the kiln while effecting rotation thereof.

The product may be fed through the kiln by any appropriate means and in some instances, to avoid the accumulation of strains and prevent deformation, it may be desirable to place the product in containers which may then be pushed or pulled through the kiln to accomplish the firing. Means also may be provided to remove the container and product from the hot zone of the kiln while it is in a plastic state and ahead of schedule. In this event it may be desirable to repeat the firing cycle if necessary to remove residual stresses from the finished product.

The rotation of the product during the firing procedure can be accomplished in a number of ways. It is preferred, however, that the product be carried inside of tubular containers that may be supported on rotatable rolls to be disposed for movement through the kiln in an axial direction, the containers being adapted for engagement with said roller means to effect rotation of the container as it is moved longitudinally through the kiln. When the product is disposed in such containers, the product is frictionally engaged by the walls thereof to be rotated as the container is rotated by the driven rolls to effect elimination of stresses and uniform firing of the product.

The kiln structure itself can be of any type, but preferably is of a tubular construction through which the product can be fed continuously in a longitudinal direction. The kiln may be gas fired or heated by electrical resistance or by other means in any well known manner.

The following provides a more detailed description of the invention wherein:

FIG. 1 is a schematic elevation of an installation for firing circular ceramic products;

FIG. 2 is an enlarged cross sectional elevation taken through the kiln structure and showing the disposition of the product within its container and at the entrance end of the heating zone;

FIG. 3 is an end view looking from the right hand side of the apparatus represented in FIG. 1; and FIG. 4 is a detail view of an elongated rotatable connector for coupling the container leaving the kiln to a pulling cable.

The preferred conveyor structure and kiln for firing tubular ceramic products of great length and especially those having a circular cross section includes a kiln 1 which is shown in more detail in FIG. 2. The kiln 1 has element 2 made of a suitable material throughout its length which has a portion heated between its ends providing a firing zone which may be heated by any suitable means such as burning gas or electrical resistance adjacent its exterior surface to produce the desired temperature within the firing zone or tubular element 2. The ends of the tubular element are open and extend beyond the walls of the kiln so that they may be cooled somewhat by circulation of the atmospheric air.

The heating means is represented diagrammatically by the electrical resistor elements 3 in FIGS. 1 and 2 in the preferred form of the invention and these heaters may be formed of molybdneum which may be energized by connection to an appropriate source of electricity by conductors 4. A suitable manifold 5 may be provided for supplying hydrogen or other gaseous atmosphere within the chamber defined by insulation 6 and wall 7 to protect the molybdenum resistors.

A kiln of this construction may be held to a relatively small dimension especially in consideration of the length of the product to be fired. In order to feed and rotate the product uniformly and continuously through the hot zone of the kiln, a plurality of supporting frames or stands 8 are provided which support pairs of rotatably driven shafts 9 on the infeed side of the kiln and 10 on the outlet end of the kiln. The shafts 9 and 10 are mounted in their supports in alignment with each other and are simultaneously rotatably driven by a motor 11 which is connected through driving chains 12 trained over sprocket wheels to effect rotation of the pairs of supporting shafts 9 and 10 at the same rate in the same direction as is clearly shown in FIG. 3.

At the inlet end to the kiln, a rotatable tube 13 is provided which partially projects into the kiln and is driven to rotate by frictional engagement with an enlarged portion 9' fixed to the rotatable support shaft 9. The tube 13 is held in suitable spaced thrust bearings engaging the ends of a pair of oppositely disposed shoulders 9' on the pair of shafts 9 so that tube 13 cannot move longitudinally through the hot zone but may be positively rotated about its longitudinal axis as indicated in FIGS. 1 and 3.

Preferably, but not necessarily, due to the long length of the product being fired, the outlet end of the kiln may be provided with a rotatable tube 14 similar to 13. When a single tube is used the product coming out of the kiln will be cradled and supported between pairs of spaced driven portions or shoulder 10' on roller 10, aligned with the internal surface of the single tube 13 and will be rotated thereby.

When the tube 14 is used, however, it is disposed so that it partially projects into the kiln and is caused to rotate in the same direction as tube 13 by engagement with similar rollers 10' on the driven shaft 10. Tube 14 is disposed in alignment with but spaced longitudinally from the tube 13 and is generally of the same size for purposes as will appear below. Tube 14 is likewise held against longitudinal movement by suitable spaced thrust bearing means engaging the opposite ends of the pair of shoulders 10' on the pair of shafts 10.

Product to be fired such as a tube 15, may be placed in a hollow cylinder or container 16 in which it is free to rotate, during its movement through the kiln. The container 16 made of a suitable refractory material is adapted to be placed upon shoulders 9' of the support shafts 9 and are positioned and engaged by the spaced shoulders 9' rotatable with the shaft 9 to be held in alignment with the internal wall of tube 13. The container 16 upon being situated on and cradled between pairs of driven spaced shoulders 9' is adapted to be pushed along them to be fed into the rotating tube 13 for passage through the firing zone. The container is fed into tube 13 by a pusher 20 which engages against the rear end of the container 16. It will be apparent that one or more pushers 20 may be carried on the endless chain 17 entrained about sprockets 18, driven by a power take-off from a shaft 19 driven by the motor 11 to effect traverse of the container 16 with the product therein or in some instances to push the product itself through the kiln. After the container 16 or product has been delivered into the firing zone with a continuous slow feeding motion, the container 16 may be in one form of the invention continued on its passage through the kiln by means of the pulling cable 21 passing over pulleys 22 which may be attached by any suitable means such as a swivel arrangement with a contractable hook inserted in a hole at the extending end or nose of the container 16. Cable 21 may be connected at its other end to a carriage 23 fixed to an endless chain 24 carried on sprockets 25 synchronously driven by the shaft 19 in the same manner as chain 17 to effect a synchronous continued feeding of container 16 through the firing zone at the same desired rate.

Another way in which the product 15 itself or the container 26 with the product therein, may be traversed is by pushing the container 26 or product 15, which in turn may be pushed with another one from behind which is pushed by the pusher 20. Both the pusher 20 and the carriage 23 may be retracted to their starting position by a well known clutch type reversing mechanism not shown, associated with its driving means.

It is apparent that container 16 with the product 15 therein, or if it is desired to traverse the product 15 itself it is supported as it passes through the firing zone by its engagement with the internal surfaces of the infeed tube 13 and exit tube 14 after bridging the space in the hot zone between them so that the container with the product therein or the product itself is continuously rotated by such engagement as the product is passing through the hot zone. Thus the product is simultaneously delivered through the firing zone to be treated while being rotated either within the container 16 or by itself.

In following this teaching it is possible to fire relatively long circular products such as an elongated tube 15 in a kiln of relatively short length. Furthermore, by making use of this invention it is possible to fire the product under conditions which simultaneously relieve any stresses and deformation by rotating it while in its plastic state to effect uniform heating thereof while rolling it to preserve its original circular cross section.

While the above describes the preferred form of the invention, it is obvious that many modifications of this invention may occur to those skilled in the art which will fall within the scope of the following claims.

We claim:

1. A kiln for firing an elongated ceramic product or the like comprising a high temperature firing zone in said kiln, a rotatable tube extending into the entrance portion of the firing zone of the kiln, a second rotatable tube extending from the exit portion of the firing zone of the kiln in axial alignment with said first tube, means to rotate said first and second tube at the same rate in the same direction about their respective longitudinal axes, and synchronously driven means to feed the product longitudinally through tubes and fining zone of the kiln, said means to rotate said first and second tube being independent of said means to feed the product through said tubes.

2. A kiln for firing an elongated ceramic product or the like comprising a high temperature firing zone, a pair of spaced axially aligned tubes extending into the firing zone of the kiln at both its ends, spaced pairs of synchronously driven rollers supporting and rotating said tubes, and synchronously driven push and pull means to traverse the product axially through the tubes and firing zone of the kiln while effecting rotation of said product, said synchronously driven rollers being driven by means independent of means driving said synchronously driven push and pull means.

3. Apparatus for producing a long straight circular ceramic product, comprising a kiln having a hot zone for firing the product, a rotatable tube extending into the entrance portion of said hot zone, a second rotatable tube extending from the exit portion of said hot zone in axial alignment with said first tube, a hollow rotatable cylinder for receiving the product to be fired in frictional engagement with said tubes, a straight walled cylindrical surface in the cylinder in supporting engagement with the entire length of the product, said cylindrical surface frictionally rotating the product when said cylinder is rotated, means to rotate said first and second tube at the same rate in the same direction about their longitudinal axes thereby rotating said cylinder, and synchronously driven means to feed the cylinder longitudinally through said tubes and hot zone, said means to rotate said first and second tubes being independent of said means to feed said cylinder through said tubes.

References Cited by the Examiner

UNITED STATES PATENTS

| | | | |
|---|---|---|---|
| 1,138,674 | 5/1915 | Little et al. | 264—65 |
| 2,245,181 | 6/1941 | Brooks | 25—142 |
| 2,317,009 | 4/1943 | Wilson et al. | 263—7 |
| 2,529,689 | 11/1950 | Hess | 263—3 X |
| 2,592,236 | 4/1952 | Bloom | 263—6 |
| 2,638,333 | 5/1953 | Hess | 263—3 |
| 2,883,729 | 4/1959 | Ito | 25—157 |
| 2,948,949 | 8/1960 | Schuffler et al. | 25—157 |

FOREIGN PATENTS

| | | |
|---|---|---|
| 599,159 | 5/1960 | Canada. |
| 1,113,172 | 8/1961 | Germany. |

J. SPENCER OVERHOLSER, *Primary Examiner.*

MORRIS LIEBMAN, ROBERT F. WHITE, WILLIAM J. STEPHENSON, *Examiners.*